Aug. 12, 1958  A. SERNA  2,847,591
DIRECT CURRENT GENERATOR
Filed March 28, 1956

INVENTOR.
Alex Serna
BY Barthel & Bugbee
Attys

2,847,591

DIRECT CURRENT GENERATOR

Alex Serna, Dearborn, Mich.

Application March 28, 1956, Serial No. 574,401

7 Claims. (Cl. 310—68)

This invention relates to dynamo-electric machines and, in particular, to direct current generators.

One object of this invention is to provide a direct current generator wherein the mechanical commutating means for changing the generated alternating current into a delivered direct current, namely the segmental bar commutator and brushes found in prior direct current generators with their attendant defects, is replaced by a purely electrical commutating means which is free from the defects of such mechanical means.

Another object is to provide a direct current generator of the foregoing character wherein the electrical commutating means employs commutator elements of magneto-resistive material which are rotated into and out of an interrupted annular magnetic field in such a manner as to substantially prevent current flow while in the magnetic field and permit current flow when out of the magnetic field, because of the increased resistance of the material when in the magnetic field.

Another object is to provide a direct current generator of the foregoing character wherein the electrical commutating means makes use of commutator elements which, by other than mechanical means substantially prevent the flow of current except at predetermined locations in each revolution, for example, by causing the generated current to flow through commutator elements of so-called magneto-resistive material, such as bismuth, which has a high resistance to the flow of electric current while in a strong magnetic field but a low resistance while out of such a field, these commutator elements being distributed at circumferentially-spaced locations around the periphery of the commutator and caused to rotate between radially-spaced rings of soft iron or other suitable material forming part of a magnetic circuit and having peripheral gaps therein arranged at diametrically opposite points, whereby substantial current flow through the magneto-resistive commutator elements is permitted only when they are passing across these gaps when out of the magnetic field between the rings and prevented when the magneto-resistive commutator elements are passing through the radial magnetic field between the rings.

Another object is to provide a modified direct current generator wherein the commutating means includes spark gap tubes arranged in circumferentially-spaced relationship to rotate into and out of an interrupted annular magnetic field, the tubes containing mercury and an ionizable gas such as argon, krypton, or xenon, these gases aiding the vaporization of the mercury, the magnetic field blowing out the arc between the electrodes of the tubes except when the tube passes through the gap where no electromagnetic field exists.

Other objects and advantages of the invention will become apparent during the course of the following description of the accompanying drawings, wherein.

Figures 1, 6:
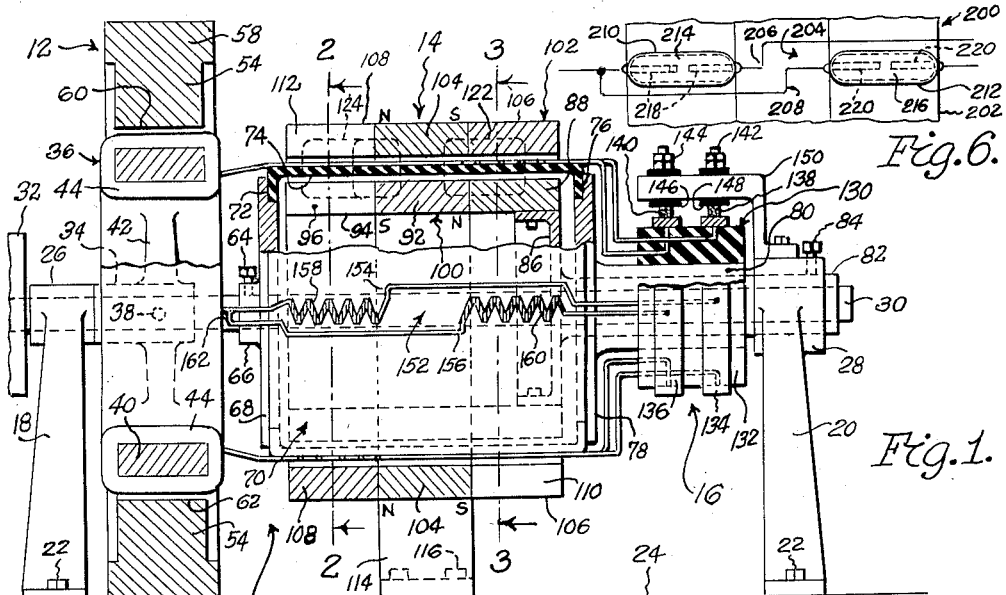
Figure 1 is a central longitudinal section, partly in side elevation, of a direct current generator employing magneto-resistive commutating elements, according to one form of the invention.
Figures 2, 3:
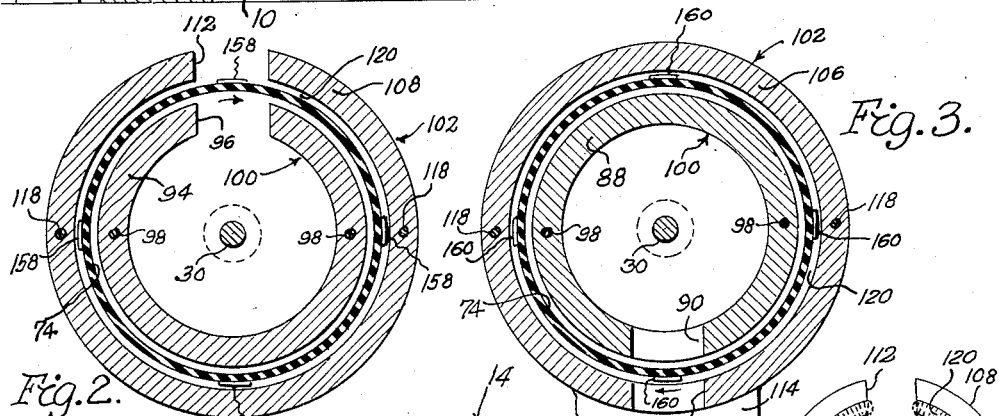
Figure 2 is a cross-section taken along the line 2—2 in Figure 1.
Figure 3 is a cross-section taken along the line 3—3 in Figure 1, with the same simultaneous position of the elements as in Figure 2.
Figures 4, 5:
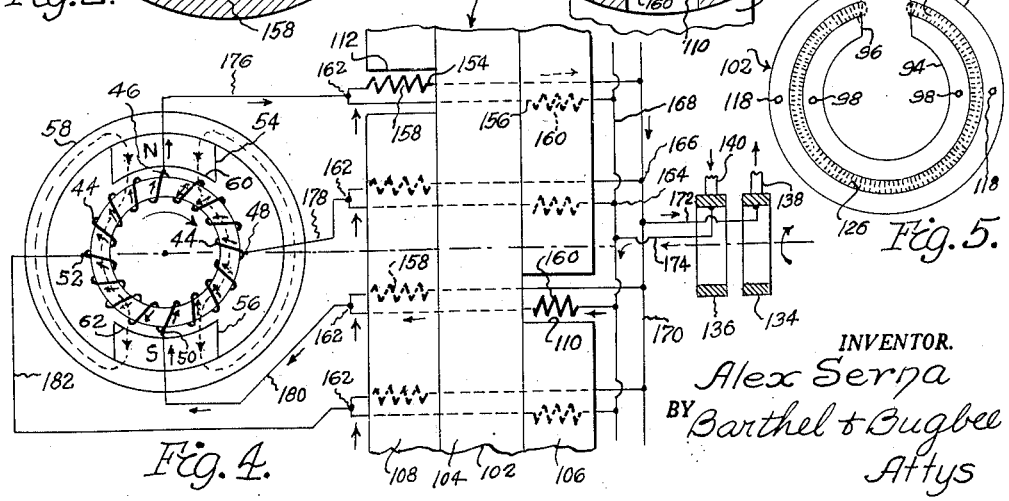
Figure 4 is a diagrammatic view of the electrical and magnetic circuit of the direct current generator of Figures 1 to 3 inclusive, with the commutating portion thereof shown in a developed view of a part only of the periphery thereof.

Figure 5 is a diagrammatic side elevation of a set of the interrupted external and internal annular field rings of Figures 1 to 3 inclusive, with the substantially radial magnetic lines of force extending therebetween; and Figure 6 is a diagrammatic plan view of a modified commutating means adapted to be employed in the direct current generator of Figure 1 with gaseous arc discharge tubes in place of the magneto-resistive commutating elements of Figure 1.

Referring to the drawing in detail, Figure 1 shows a direct current generator, generally designated 10, for producing pulsating direct current from alternating current, and consisting generally of an alternating current generating unit 12, a commutating unit 14 and a current collecting unit, generally designated 16, the rotary parts being rotatably mounted on spaced pedestals 18 and 20 respectively. The pedestal elements 18 and 20 are bolted or otherwise secured to the floor or base 24 in axially-spaced alignment and are provided with bearing bosses 26 and 28 respectively adapted to rotatably support a rotary inner shaft 30. The end of the shaft 30 remote from the current collecting unit 16 is provided with a power connection or driving member 32, such as a pulley, gear or coupling to another shaft driven by a prime mover such as an electric motor, internal combustion engine or the like. The bearing boss 26 of the pedestal 18 is bored to rotatably receive and support the left-hand end of the inner shaft 30, a plain bearing being shown for the sake of simplicity but anti-friction bearings being usable if desired.

Mounted on the shaft 30 on the opposite side of the bearing boss 26 from the driving member 32 is the hub 34 of a rotor 36 of the alternating current generating unit 12 drivingly secured to the shaft 30 in any suitable way, such as by the bolt 38. The rotor 36 has a peripheral ring 40 of magnetic material, such as soft iron, connected to the hub 34 by spokes 42. The ring 40, which is of the so-called Gramme ring type, is provided with a continuous winding 44 extending entirely around the periphery of the ring so as to form a roughly torus-shaped coil of wire.

The coil or winding 44 of the ring 44 is tapped at circumferentially-spaced intervals, only four taps 46, 48, 50 and 52 respectively being shown (Figure 4) for purposes of simplicity. In actual practice, the coil or winding 44 is tapped at a large number of circumferentially-spaced locations so as to reduce the pulsating effect of the direct current generated by reducing the duration of each pulse. Mounted in diametrically opposite positions relatively to the rotor 36 are the field pole pieces 54 and 56 of opposite magnetic polarity connected to the annular field magnet 58 which for simplicity is shown as an annular permanent magnet of the conventional aluminum-nickel-cobalt type. The pole pieces 54 and 56 are of magnetic material, such as soft iron, and have concave faces 60 and 62 respectively where they lie adjacent the periphery of the winding 44 on the ring 40 of the rotor 36.

Bolted or otherwise secured as at 64 to the inner shaft 30 is the hub 56 of the driving end disc 68 of the commutator rotor, generally designated 70. The disc 68 is preferably of non-magnetic material, such as brass, and is rabbeted as at 72 to receive the flanged end of an approximately hollow cylindrical commutator shell 74, preferably of non-magnetic insulating material such as a moldable plastic material, for example the insulating materials known commercially as Micarta, formica or the like. The opposite flanged end of the commutator shell 74 is seated in the rabbeted portion 76 of the driven end disc 78, which is also preferably of non-magnetic material such as brass and which has a hollow hub 80. The latter is bored to rotatably receive a hollow outer shaft 82 which in turn is bored to rotatably receive the inner shaft 30. The hollow shaft 82 does not rotate, but is bolted or otherwise held in fixed position as at 84 in the bearing boss 28 of the pedestal 20, the boss 28 being suitably bored to receive the hollow outer shaft 82. Thus, the hollow shaft 82 serves as a bearing for rotatably supporting both the hub 80 of the disc 78 and also the shaft 30.

Secured to the inner end of the hollow outer shaft 82 is a flanged disc 86, the flange of which is in turn bolted or otherwise secured to the interior of a first internal interrupted annular magnetic field conductor 88 having a gap 90 at the bottom thereof (Figure 3). Secured to the inner end of the magnetic field conductor 88 is an internal field magnet 92 of any suitable construction, the construction shown, for purposes of simplicity, being that of a continuous and unbroken annular permanent magnet of the aluminum-nickel-cobalt type. It will be evident, however, that an electro-magnet might equally well be used in place of the internal field magnet 92. Secured to the opposite ends of the internal field magnet 92 is a second internal interrupted annular magnetic field conductor 94 having a gap 96 at the top thereof (Figure 2) placed 180° circumferentially away from the gap 90 in the internal field conductor 88. The first and second magnetic field conductors 88 and 94 and the internal annular field magnet 92 are secured to one another in any suitable way, such as by longitudinally-extending bolts 98 (Figures 2, 3 and 5).

The internal hollow cylindrical magnetic unit, generally designated 100, consisting of the internal annular field magnet 92 and the first and second interrupted annular internal magnetic field conductors 88 and 94, is arranged inside the hollow cylindrical commutator rotor 70 in radially-spaced relationship therewith (Figures 2 and 3) so that the commutator shell 74 can rotate freely therearound without having physical contact therewith. Arranged externally of the commutator shell 74 of the commutator rotor 70 is an external hollow cylindrical magnetic unit, generally designated 102, and consisting of a central annular continuous external field magnet 104 to the opposite ends of which are bolted first and second external interrupted annular magnetic field conductors 106 and 108 respectively having gaps 110 and 112 respectively arranged at the bottom and top respectively 180° apart (Figures 2 and 3). The external field magnet 104 is mounted on a pedestal 114 which is bolted or otherwise secured at 116 to the floor or base 24, and like the internal field magnet 92 is shown as a permanent magnet, such as of the aluminum-nickel-cobalt type, but may equally well be made as an electromagnet.

The first and second external magnetic field conductors 106 and 108, like their internal counterparts 88 and 94, are preferably made of material which conducts magnetic lines of force, such as soft iron, and are similarly bolted or otherwise secured to one another as at 118 (Figures 2, 3 and 5) and are similarly spaced radially away from the commutator shell 74 of the commutator rotor 70 so as to permit free rotation thereof in the annular radial space 120 in which the commutator shell 74 rotates. In this manner, the magnetic lines of force from the internal and external field magnets 92 and 104 are caused to traverse the internal and external magnetic field conductors 88, 94 and 106, 108 respectively and form magnetic circuits extending across the annular space 120 through the commutator shell 74 as indicated by the magnetic circuit paths 122 and 124 in Figure 1 and the approximately radially-extending magnetic lines of force 126 in Figure 5.

Mounted on the hub 80 of the commutator rotor 70 and drivingly connected thereto so as to be rotatable therewith is the rotary collector ring unit, generally designated 130 (Figure 1) forming a part of the current-collecting unit 16 and including an annular insulator 132 upon which collector rings 134 and 136 are mounted in axially-spaced relationship. The collector rings 134 and 136 are made of any suitable electrically-conducting material, such as copper or brass, and are engaged by brushes 138 and 140 respectively connected to terminals 142 and 144 respectively through insulating tubes or sleeves 146 and 148 mounted in an angle bracket 150 which is bolted or otherwise secured to the bearing boss 28 of the pedestal 20 in such a manner as to overhang the collector rings 134 and 136. The terminals 142 and 144 are adapted to be connected to an external electrical circuit (not shown) which utilizes the pulsating direct current generated by the generator 10.

Mounted at circumferentially-spaced intervals in and around the periphery of the commutator shell 74 of the commutator rotor 70 are paired sets, generally designated 152, of magneto-resistive commutating elements 154 and 156. For purposes of simplicity of showing, only four such sets 152 are illustrated in the drawings, positioned 90° apart around the periphery of the commutator shell 74. In actual practice, however, a large number of sets 152 would be employed, each corresponding to a tap on the winding 44 of the alternating current generator rotor 36, such as the taps 46, 48, 50 and 52. Each commutating element 154 or 156 includes a grid or zigzag member 158 or 160, also of magneto-resistive material such as bismuth, nickel and alloys thereof having the property of changing their electrical resistance when placed in or out of a magnetic field. Such magneto-resistive materials are only weakly conductive or substantially non-conductive when in the presence of a strong magnetic field and become strongly conductive of electricity only when removed from the magnetic field or placed in a weak magnetic field.

The zigzag members 158 and 160 are so located in each set 152 as to be placed in close proximity to one or the other of the internal and external magnetic field conductors 88, 94 or 106, 108 (Figures 1, 2 and 3) and their size has been exaggerated for clearness of showing. For effective action, it is of course necessary only that the zigzag members 158 and 160 of each set 152 be of the magneto-resistive material, the conductors connecting them to the remainder of the circuit being optionally of ordinary electrically-conducting material, such as copper. The magneto-resistive commutating elements 154 and 156 of each set 152 are interconnected as at 163 (Figures 1 and 4) and at their opposite ends are separately connected as at 164 and 166 to circumferential conductors 168 and 170 respectively which in turn are connected by longitudinal conductors 172 and 174 to the collector rings 136 and 134 respectively (Figure 4). The common junctions 162 of the magneto-resistive commutating elements 154 and 156 are connected by conductors 176, 178, 180 and 182 respectively to the taps 46, 48, 50 and 52 on the winding or coil 44 of the armature rotor 36 in the alternating current generator 12.

In the operation of the direct current generator 10 of Figures 1 to 5 inclusive, let it be assumed that the driving member 32 is connected to a suitable prime mover, such as a motor or engine (not shown), thereby causing rotation of the inner or solid shaft 30, and with it the rotation of the alternating current generator rotor 36, the commutator rotor 70 and the current collecting unit 130. As the successive portions of the coil or winding 44 of the ring 40 of the alternating current generator rotor 36 pass the field pole pieces 54 and 56 of the alternating current generator field magnet 58, they cut the strong magnetic lines of force passing from the upper pole piece 54 through the lateral portions of the soft iron ring 40 to the lower pole piece 56 (Figure 4) as indicated by the dotted lines 184 and 186 in Figure 4, the magnetic circuit being completed through the lateral portions of the alternating current generating field magnet 58.

The portions of the winding 44 which are not at that instant cutting magnetic lines of force, such as those adjacent the taps 48 and 52 at that instant, do not generate current at that time. Consequently, there is a current flow in the winding 44 from approximately the tap 50 upward on opposite sides of the ring 40 to the tap 46, as indicated by the arrows in Figure 4, thence through the commutating elements 154 and 156 of the sets 152 connected to the taps 46 and 50 by the conductors 176 and 180. Since the grids 158 and 160 of the diametrically opposite sets 152 of commutating elements 154 and 156 are at that instant passing across the gaps 96, 112 at the top (Figure 2) and the gaps 90 and 110 at the bottom of the magnetic field conductors 94, 108 and 88, 106 respectively where the magnetic fields are at a minimum, the magneto-resistive material, such as bismuth, of which these are composed, is outside the magnetic field produced by the commutating field magnets 92 and 104 and its conducting qualities are at their maximum.

The other sets 152 which are momentarily within the annular space 120 (Figures 2 and 3) between the outer and inner commutator magnetic units 102 and 100 respectively, are subjected to a strong magnetic field as indicated by the lines of force 120 in Figure 5, and therefore cause the resistance of the grids 158 and 160 of the commutating elements 154 and 156 to rise to a degree which substantially prevents or greatly inhibits flow of electricity therethrough. As a result of this action, the electricity conducted to the collector ring 134 from the peripheral conductor 170 and thence through the external electrical circuit and back to the collector ring 136 proceeds through the conductor 174 and peripheral conductor 168 through the lower set 152 and the conductor 180 to the tap 50, completing the circuit.

As each portion of the winding 44 of the generator rotor 36 comes into the magnetic field 184, 186 (Figure 4) adjacent the pole pieces 54 and 56, the generation of current continues, and is changed by the above-described action of the magneto-resistive commutating elements 154 and 156 to pulsating direct current by the commutating unit 14. The greater the number of taps from the winding 44, with a correspondingly great number of sets 152 of paired commutating elements 154 and 156, the shorter is the duration of each pulsation and the more nearly continuous the flow of direct current becomes.

The modified direct current generator, generally designated 200, shown in Figure 6 is generally similar to the generator 10 shown in Figures 1 to 4 inclusive, and differs only in the commutating elements. In place of the magneto-resistive commutating elements 154 and 156, and particularly in place of the magneto-resistive grids or zigzag members 158 and 160 (Figure 1), the generator 200 employs a commutator rotor 202 having multiple paired sets 204 of commutating elements 206 and 208, each element containing a commutating member 210 or 212 consisting of an individual tube 214 or 216 with spaced electrodes 218 or 220 forming a spark gap within an atmosphere of an ionizing gas such as argon, krypton or xenon, and mercury which becomes vaporized within the tubes 214 and 216.

In the operation of the modified direct current generator 200 of Figure 6, let it be assumed that the commutating members 210 and 212 have replaced the magnetoresistive grids 158 and 160 in each set 152 of the commutation rotor 70 of Figure 1 and that, as before, power has been applied to the driving member 32 to rotate the shaft 30 and with it the alternating current generator motor 36, the modified commutator rotor 70, now designated 202 (Figure 6), and the current collecting unit 130. The current generation occurs again as described in connection with Figures 1 to 4 inclusive and follows the same paths described above.

As each commutating member 210 or 212 traverses the annular space 120 within the strong magnetic field, the arc between its electrodes 218 and 220 is magnetically suppressed or "blown out" as customarily described. When each tube 214 or 216 arrives in either the gap 96, 112 or the gap 90, 110 (Figures 2 and 3), it passes out of the strong magnetic field and the arc is reinstated, causing flow of electric current momentarily to take place. This current is collected by the brushes 138 and 140 from the collector rings 134 and 136 as before, and traverses the external circuit and returns to the tapped alternating current generator winding 44 in the manner described above. Thus, the modified direct current generator 200 of Figure 6 is generally similar in construction to the direct current generator of Figures 1 to 4 inclusive, except for the replacement of the magneto-resistive commutating grids 158 and 160 by the electron discharge tubes 210 and 212, and the different principle of operation employing magnetic arc blowout or suppression rather than change in resistance of the magneto-resistive grids 158 and 160 when passing through or outside of the magnetic field.

It will be understood that the magneto-resistive elements may include thin films of magneto-resistive material deposited upon a support of insulating material, such films, for example, being of bismuth, nickel or of nickel-iron alloys such as the alloy known commercially as "Permalloy." These films may be deposited in any suitable maner, such as by spraying, electro-deposition, evaporation or other commercially known means of applying such films.

What I claim is:

1. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another.

2. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another, said magnet being of annular shape and said pole units being secured to opposite ends of said magnet.

3. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another, each of said pole units including an external magnetic pole member and an internal magnetic pole member spaced radially therefrom, said commutator structure support rotating in the space between said members.

4. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another, said magnet being of annular shape and said pole units being secured to opposite ends of said magnet, each of said pole units including an external magnetic pole member and an internal magnetic pole member spaced radially therefrom, said commutator structure support rotating in the space between said members.

5. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another, each of said pole units including an external magnetic pole member and an internal magnetic pole member spaced radially therefrom, said commutator structure support rotating in the space between said members, each pair of said external and internal pole members being radially aligned with one another.

6. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another, said current flow interrupting devices including conducting portions of magneto-resistive material disposed adjacent said pole units in the magnetic fields thereof.

7. A direct current generator comprising an alternating current generating machine including a rotor having a winding thereon with circumferentially-spaced pairs of diametrically-oppositely-disposed taps therein, an approximately cylindrical rotary commutator structure and a pair of current-collecting rings all operatively connected to said rotor for rotation therewith, said commutator structure having an approximately cylindrical support with pairs of axially-disposed magnetically-responsive current flow interrupting devices disposed at circumferentially-spaced intervals in two belts therearound, the devices of each pair being spaced axially apart from one another along said support, the devices of each pair being connected at one end thereof to one of said taps and at the opposite ends thereof respectively to said collecting rings, terminal contact elements slippingly engaging said collecting rings, and a commutator magnet structure encircling said support, said magnet structure including a magnet adapted to provide a magnetic flux and a pair of axially-spaced interrupted annular magnetic pole units secured to opposite poles of said magnet and respectively encircling said belts of axially-spaced current flow interrupting devices, said pole units each having a peripheral gap therein, said peripheral gaps being spaced circumferentially apart from one another, said current flow interrupting devices including electron discharge tubes containing spaced electrodes and an ionizing gas, said tubes being disposed adjacent said pole units in the magnetic fields thereof.

References Cited in the file of this patent

UNITED STATES PATENTS 2,512,325     Hansen _____ June 20, 1950